United States Patent
Wiley

[11] 3,841,839
[45] Oct. 15, 1974

[54] CATALYTIC CONVERTER

[75] Inventor: Robert F. Wiley, Corning, N.Y.

[73] Assignee: Corning Glass Works, Corning, N.Y.

[22] Filed: Nov. 17, 1972

[21] Appl. No.: 307,462

[52] U.S. Cl............ 23/288 F, 23/288 R, 252/477 R
[51] Int. Cl............................ F01n 3/14, B01j 9/04
[58] Field of Search......... 23/288 F, 288 R; 60/299; 252/477 R

[56] References Cited
UNITED STATES PATENTS

| | | | |
|---|---|---|---|
| 1,789,812 | 1/1931 | Frazer.................... | 23/288 F UX |
| 3,065,595 | 11/1962 | Gary........................ | 23/288 F UX |
| 3,248,188 | 4/1966 | Chute...................... | 23/288 F UX |
| 3,404,965 | 10/1968 | Shiller.................... | 23/288 F |
| 3,441,381 | 4/1969 | Keith et al.............. | 23/288 F |
| 3,441,382 | 4/1969 | Keith et al.............. | 23/288 F |
| 3,597,165 | 8/1971 | Keith et al.............. | 23/288 F |
| 3,692,497 | 9/1972 | Keith et al.............. | 23/288 F |
| 3,768,982 | 10/1973 | Kitzner et al........... | 23/288 F |
| 3,770,389 | 10/1973 | Kitzner et al........... | 23/288 F |

*Primary Examiner*—Barry S. Richman
*Attorney, Agent, or Firm*—Charles W. Gregg; Clarence R. Patty, Jr.

[57] ABSTRACT

A catalytic converter to be used in exhaust systems of internal combustion engines for emission control purposes. The converter comprises an assembly including a pair of generally frusto-conical or funnel shaped and concentric metal housings or casings forming a container surrounding a partly cylindrical honeycomb core catalytic member of a material having high temperature durability and a low coefficient of thermal expansion, such as a refractory ceramic material, and the container is designed to compensate for the differences in thermal expansion of the material of the catalytic member and the metal material of the assembly of the housings or casings of the container.

4 Claims, 3 Drawing Figures

PATENTED OCT 15 1974　　3,841,839

CATALYTIC CONVERTER

BACKGROUND OF THE INVENTION

It has long been known that the exhaust gases from internal combustion engines of automobiles and similar types of vehicles are pollution sources which are largely responsible for air pollution problems in cities and other densely populated areas and, therefore, so-called emission control of such exhaust gases is being intensively and extensively pursued in order to reduce, to the extent possible, air pollution from said sources. Catalytic oxidation converters in the exhaust systems of automotive vehicles having internal combustion engines are extremely helpful in reducing air pollution from such sources but, insofar as is known, a completely acceptable and economical catalytic converter has not heretofore been developed.

While refractory ceramic core members for catalytic converters have been developed to the point where they perform substantially satisfactorily, such core members embody a honeycomb of very small passages or channels with relatively thin walls and the ceramic material of the core members is a relatively brittle material. For this reason the core members must be mounted in their casings or containers so that they are always securely held and do not become loose at any time so as to shake about in the casings or containers and thereby become broken up, cracked, chipped or otherwise fractured. Differences in the coefficients of thermal expansion of the ceramic materials of the core members and the metal materials of the containers or casings for such members impose the problem of mounting the core members within the containers or casings in a manner to compensate for said differences in expansion and thereby prevent said fracturing, chipping or breaking up of the core members by their shaking about in their casings or containers. Containers or casings that have been heretofore developed for the purposes of solving said problem have usually been either relatively elaborate or complex and, therefore, uneconomical, or have not been sufficiently durable for the satisfactory solution of the fracturing problem. The present invention was, therefore, developed to provide catalytic converters of the type mentioned, and including relatively economical and generally otherwise satisfactory and relatively durable casings or containers for the core members of the catalytic oxidation converters.

SUMMARY OF THE INVENTION

A brief summary of the invention is believed to be sufficiently contained in the foregoing abstract of the disclosure and, therefore, for the purposes of brevity and to prevent redundancy, no further brief summary of the invention will be given nor is considered necessary.

BRIEF DESCRIPTION OF THE DRAWINGS

In the drawings.

Similar reference characters refer to similar parts in each of the FIGS. of the drawings.

PREFERRED EMBODIMENTS OF THE INVENTION

Figure 1:
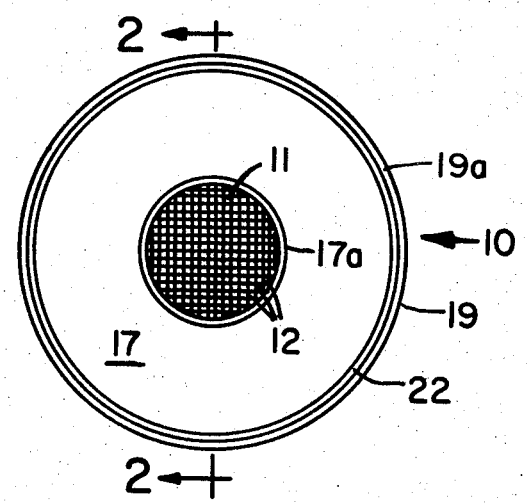
FIG. 1 is an elevational end view of one form of catalytic converter embodying the invention.
Figure 2:
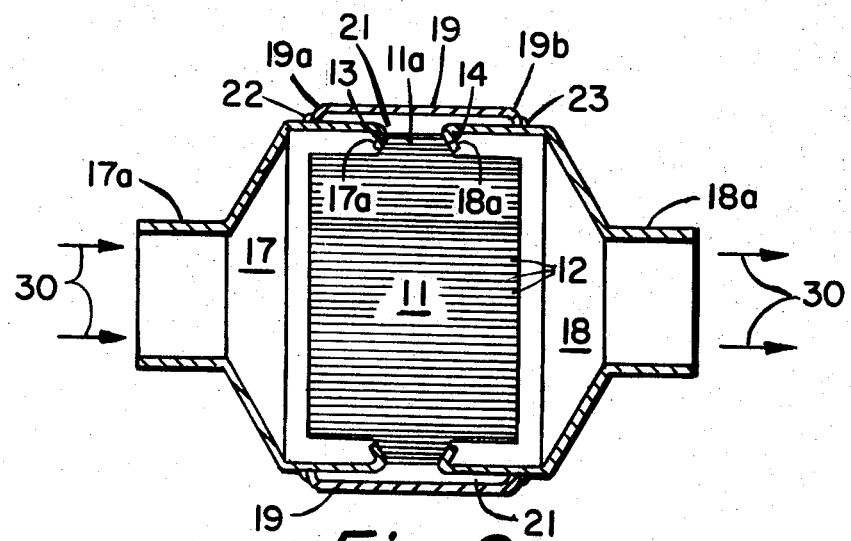
FIG. 2 is a side cross-sectional view of the converter of FIG. 1, such view being taken generally along line 2—2 of FIG. 1.
Figure 3:
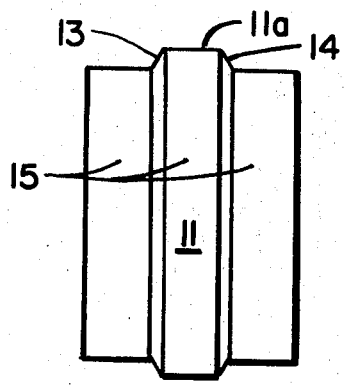
FIG. 3 is a side elevational view of one form of a core member for the catalytic converter of FIGS. 1 and 2.

Referring to the drawings in detail, there is shown in FIGS. 1 and 2 a catalytic converter 10 comprising a generally or partly cylindrical honeycomb body or core member 11 (see also FIG. 3) of a refractory ceramic material having a myriad of relatively minute passages such as 12 extending therethrough from one of the planar ends of the core member or honeycomb body to the other. Such core member or body includes an annularly projecting collar or flange portion 11a whose brims 13 and 14 are evenly beveled or chamfered as illustrated in FIGS. 2 and 3. The outer periphery of member 11, between said beveled brims 13 and 14 and the ends of member 11, and including the outer periphery of said flange or collar portion 11a are preferably provided with a substantially hermetic band or bands such as 15 (FIG. 3) which may, for example, be of the same refractory ceramic material as the core member 11 itself.

Core member or honeycomb body 11 may, for example, be made by the method disclosed in U.S. Pat. No. 3,246,972, issued Apr. 19, 1966 to Gail P. Smith, and reference is made to lines 52 through 75 of column 4, and lines 1 through 73 of column 5 of such patent if a specific example of one method of making the honeycomb body 11 is desired. Reference is also made to my copending application Ser. No. 280,508, filed Aug. 14, 1972 for an extrusion die and method of making same, such application being assigned to the same assignee as the present application. Such copending application covers an extrusion die similar to one which can be expeditiously used in conjunction with the method covered by the cited patent to G. P. Smith to form refractory ceramic core members or honeycomb bodies of the present application. Following such making of the honeycomb body or core member 11 per se, the ends of the peripheral walls thereof may be machined or ground off to provide the collar or flange portion such as 11a. The walls of the passages such as 12 extending through the body or core member have an oxidation catalyst deposited thereon, such catalysts and methods of deposition thereof being well known in the art. In this connection reference is made to U.S. Pat. No. 3,441,381, issued Apr. 29, 1969 to C. D. Keith et al.

Referring further to FIG. 2, there is provided first and second generally funnel shaped and identical metallic casings 17 and 18, respectively, each having a large open end of a diameter somewhat greater than the diameter of core member 11 and having radially inwardly extending flange portions 17a and 18a, respectively, which bend or slope from said large open ends at angles conforming or corresponding to the angles of the beveled brims or chamfers 13 and 14 of collar or flange portion 11a of body or core member 11. Casings 17 and 18 are preferably made of a stainless steel material in order to provide relatively smooth surfaces for the casings, and because of the relatively high oxidation resistance properties and relatively low coefficient of thermal expansion of such a metallic material. The large open ends of casings 17 and 18 taper to small cylindrical ends 17a and 18a, respectively, which form inlet and outlet conduits for exhaust gases as further discussed hereinafter.

Casings 17 and 18 are disposed oppositely each other and core member or body 11 is positioned between said casings with the brims or chamfers 13 and 14 of flange portion 11a of the core member in firm contact with the external surfaces of the flange portions such as 17a and 18a of casings 17 and 18, respectively, adjacent said large open ends thereof. A generally cylindrically shaped metallic casing 19 surrounds and encloses the large ends of casings 17 and 18 and collar or flange portion 11a of the core member or body 11 with a space 21 provided between said casing 19 and said casings and said core member. Casing 19 is preferably made of a stainless steel material which has, for example, a coefficient of thermal expansion of about half that of the stainless steel material of casings 17 and 18. The ends 19a and 19b of casing 19 bend abruptly inwardly to peripherally contact the outer peripheries of casings 17 and 18, respectively, and said ends 19a and 19b are welded to such outer peripheries as indicated by annular welds 22 and 23, respectively. However, prior to such welding, casings 17 and 18 are forced toward each other to put such casings and flange or collar portion 11a of core member 11 under a substantial amount of compressive force and casing 19 under a substantial amount of tension or tensional force.

Although it is not necessary to the invention, it may be desirable or expedient to provide a resilient thermal or high temperature insulation material in the space 21 provided between casing 19, and casings 17 and 18 and core member or body 11. Such an expediency is for the purpose of reducing the temperature which such casing 19 may otherwise attain during use of the catalytic converter of the invention. Thermal insulation materials such as that mentioned and having suitable resiliences are well known.

In use, the catalytic converter of the invention is connected to the exhaust system of an internal combustion engine so that the exhaust gases or emissions from such engine flow, for example, into gas inlet conduit 17a (small end of casing 17) through the core member or honeycomb body of the converter in the right hand direction, as indicated by arrows such as 30 in FIG. 2, and thence out of the converter through gas outlet conduit 18a (small end of casing 18). However, as is believed obvious, the catalytic converter could be connectd to an exhaust system so that the exhaust gases flow through the converter in the direction opposite to that mentioned above, and conduits 18a and 17a then become the inlet and outlet conduits, respectively.

When the catalytic converter is connected to an exhaust system of an engine as mentioned and such engine is operating, the exhaust gases flow through core member or honeycomb body 11 and the temperature of such member is raised to about 1,500°F under steady operating conditions and may at times reach a temperature of about 1,600°F. At such times casings 17 and 18 attain a temperature of about 1,100°F while outer casing 19 reaches a temperature of about 580° to 600°F. The temperature coefficient of thermal expansion of the material of core member or honeycomb body 11 is, for example, on the order of $12.5 \times 10^{-7}$ per degree F and, under such conditions, the materials of the casings 17 and 18, and of casing 19, are selected to have temperature coefficients of thermal expansion on the order of $11 \times 10^{-6}$ per degree F and $6 \times 10^{-6}$ per degree F, respectively.

As core member 11 increases in temperature from the heat of the exhaust gases, it expands radially and linearly and is, thereby, subject to increasing compressive forces. However, as casings 17 and 18 also increase in temperature they also expand radially and linearly. Such linear expansion tends to apply even greater compressive forces to flange or collar portion 11a of core member 11 but the radial expansion of casings 17 and 18 tends to somewhat relieve such compressive forces because the beveled brims or chamfers 13 and 14 of member 11 are free to move or slide on the contacted surfaces of flanges 17a and 18a of casings 17 and 18 adjacent the large ends of such casings. As casing 19 increases in temperature and expands linearly, said additional compressive forces are further relieved as the linear expansion of casings 17 and 18 is compensated for to some extent by said linear expansion of the casing 19. Radial expansion of the casing 19 can, of course, be ignored. In any event the radial expansion of casings 17 and 18 and the linear expansion of casing 19 is sufficient to prevent the subjection of core member or honeycomb body 11 to undue compressive stresses while at the same time maintaining the chamfers or beveled brims 13 and 14 of the flange or collar portion of such member or body in firm contact with said surfaces of flanges 17a and 18a of casings 17 and 18 and, thereby, prevent shaking about of the core member or body 11 and consequential chipping, breaking up or other fracturing of such body or member.

When the engine whose exhaust system includes the converter of the present invention is subsequently slowed down or turned off and the flow of said exhaust gases is thereby reduced or terminated, core member or body 11 cools more rapidly than the inner and outer casings. This, of course, causes contraction of the core member or body 11 but, due to said compressive forces, not to such an extent that the beveled brims or chamfers of flange or collar portion 11a of such core member are not maintained in firm contact with flange portions 17a and 18a of casings 17 and 18. Such contact is also maintained as the casings subsequently contract due to their temperatures lowering during cooling thereof. As all of the components, including core member or honeycomb body 11, casings 17 and 18, and casing 19, return to their initial or ambient temperatures, the beveled brims or chamfers 13 and 14 of flange or collar portion 11a of core member or body 11 return to their original firm contact with the contacted surfaces of flange portions 17a and 18a of casings 17 and 18, with the initial or original amount of compressive force existing between core member 11 and the flange portions 17a and 18a of such casings.

Although there is herein shown and described in detail only one form of a catalytic converter embodying the invention, it will be understood that changes and modifications may be made therein within the purview of the appended claims without departing from the spirit and scope thereof.

I claim:

1. A catalytic converter comprising, in combination;

A. a partly cylindrical core member of a refractory ceramic material having a myriad of passages extending therethrough from one planar end thereof to the other, such core member including an annular collar portion peripherally surrounding the core member with the brims of the ends of such collar portion being evenly beveled or chamfered and the walls of said passages having an oxidation catalyst deposited thereon;

B. first and second oppositely disposed and generally funnel shaped metallic casings whose large open ends have a diameter somewhat greater than the maximum diameter of said core member and which include radially inwardly extending flange portions which taper at angles conforming to said beveled brims of the ends of said collar portion of the core member, said large open ends of said first and second casings surrounding and in firm contact with the beveled brims of the first and second ends respectively of the collar portion of the core member;

C. a generally cylindrical casing surrounding and completely enclosing said large open ends of said funnel shaped casings and said collar portion of said core member with an annular space provided between the cylindrical casing and the funnel shaped casings and the core member, the ends of the cylindrical casing bent radially inwardly to contact the large ends of the funnel shaped casings; and D. means joining the ends of said cylindrical casing to the large ends of said funnel shaped casings to maintain said cylindrical casing under tension and the funnel shaped casings and the collar portion of the core member under compression, the smaller ends of the funnel shaped casings forming inlet and outlet conduits for the exhaust gases from an internal combustion engine.

2. A catalytic converter in accordance with claim 1 and in which said annular space provided between said cylindrical casing and said funnel shaped casings and said collar portion of said core member is filled with a high temperature insulation material.

3. A catalytic converter in accordance with claim 1 and in which said core member includes a substantially hermetic band surrounding the outer periphery of such member between said planar ends of the member.

4. A catalytic converter in accordance with claim 3 and in which said annular space provided between said cylindrical casing and said funnel shaped casings and said collar portion of said core member is filled with a high temperature insulation material.

* * * * *